(12) United States Patent
Dunlap, Jr. et al.

(10) Patent No.: US 10,330,201 B1
(45) Date of Patent: Jun. 25, 2019

(54) SHROUDED SEAL ASSEMBLY

(71) Applicant: United States of Americas as represented by the Administrator of NASA, Washington, DC (US)

(72) Inventors: Patrick H Dunlap, Jr., Strongsville, OH (US); John J Mayer, Cleveland, OH (US); Christopher C Daniels, Akron, OH (US); Gary M. Pease, Cleveland, OH (US); Gary J. Drlik, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 122 days.

(21) Appl. No.: 15/387,037

(22) Filed: Dec. 21, 2016

Related U.S. Application Data

(60) Provisional application No. 62/270,844, filed on Dec. 22, 2015.

(51) Int. Cl.
*F16J 15/02* (2006.01)
*B64G 1/64* (2006.01)

(52) U.S. Cl.
CPC ............ *F16J 15/025* (2013.01); *B64G 1/646* (2013.01)

(58) Field of Classification Search
CPC .......... F16J 15/025; F16J 15/00; F16J 15/027; F16J 15/062; B64G 1/646; B64G 1/60; B64G 1/52; B64G 1/54; B64G 1/543; B64G 1/546; B64G 1/58; F16L 5/00; F16L 5/10; F16L 7/02; F16L 7/00; F16L 15/00; F16L 17/00; F16L 19/00; F16L 21/00
USPC ........... 277/637; 285/94, 910, 104, 105, 353
See application file for complete search history.

(56) References Cited

U.S. PATENT DOCUMENTS

| | | | | |
|---|---|---|---|---|
| RE27,141 E | * | 6/1971 | Houot | B29C 57/02 285/110 |
| 4,174,859 A | * | 11/1979 | Houghton | F16L 17/035 277/619 |
| 5,143,381 A | * | 9/1992 | Temple | F16L 21/035 277/314 |
| 6,557,858 B1 | * | 5/2003 | Carr | F16J 15/027 277/628 |
| 6,802,513 B2 | * | 10/2004 | Ranzau | F16J 15/025 277/641 |
| 8,172,233 B2 | * | 5/2012 | Daniels | F16J 15/027 277/583 |
| 2014/0271177 A1 | * | 9/2014 | Kosmicki | F04D 29/4286 415/230 |
| 2014/0284884 A1 | | 9/2014 | Daniels et al. | |

\* cited by examiner

*Primary Examiner* — Nathan Cumar
(74) *Attorney, Agent, or Firm* — Robert H. Earp, III; William M. Johnson

(57) ABSTRACT

A seal assembly is provided that includes a protective shroud to protect a sealing element from hazardous elements and/or a hazardous environment.

19 Claims, 9 Drawing Sheets

US 10,330,201 B1

SHROUDED SEAL ASSEMBLY

CROSS-REFERENCE TO RELATED APPLICATIONS

This application claims the benefit of U.S. Provisional Patent Application Ser. No. 62/270,844 entitled "Seal with Integrated Shroud for Protection from Space Environments Exposure" filed on Dec. 22, 2015. The entirety of the above-noted application is incorporated by reference herein.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND

NASA is developing a new docking system for future missions to the International Space Station and other destinations beyond low Earth orbit. A key component of this system is the seal at the main docking interface on the top of the docking system tunnel. The seal is relatively large with a diameter of approximately 50 in. (127 cm) and is compressed during the docking process to seal the interface between the top of the docking system tunnel and the mating surface on the vehicle to which it is docking. After docking, the seal must exhibit extremely low leak rates to ensure that astronauts have sufficient breathable air for extended missions. When the docking system is not docked, the seal is left uncovered and is exposed to the environment in space including atomic oxygen, ultraviolet radiation, and impacts from micrometeoroids and orbital debris. These conditions degrade the seal material and cause higher than desired leak rates after docking.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, the innovation disclosed herein is a seal assembly that includes a sealing element having a base and at least one sealing wall extending generally perpendicular from the base, a protective shroud disposed over the sealing element that retracts to expose the sealing wall when in contact with an opposing surface, and a retainer that secures the sealing element and the protective shroud to an interface.

In another aspect, the innovation disclosed herein is a sealing system that includes an interface having a U-shaped channel defined therein, a U-shaped sealing element disposed in the U-shaped channel having pair of sealing walls, a protective shroud disposed over the U-shaped sealing element that retracts between the pair of sealing walls when in contact with an opposing interface, and a retainer that secures the sealing element and the protective shroud to the U-shaped channel.

In still another aspect, the innovation disclosed herein is a method of creating a seal that includes providing an interface having a seal assembly disposed therein, contacting a protective shroud with an opposing interface, retracting protective arms on the protective shroud toward a center of the protective shroud, contacting sealing walls of a sealing element with the opposing interface, compressing the sealing walls against the opposing interface, and creating a seal between the interface and the opposing interface.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
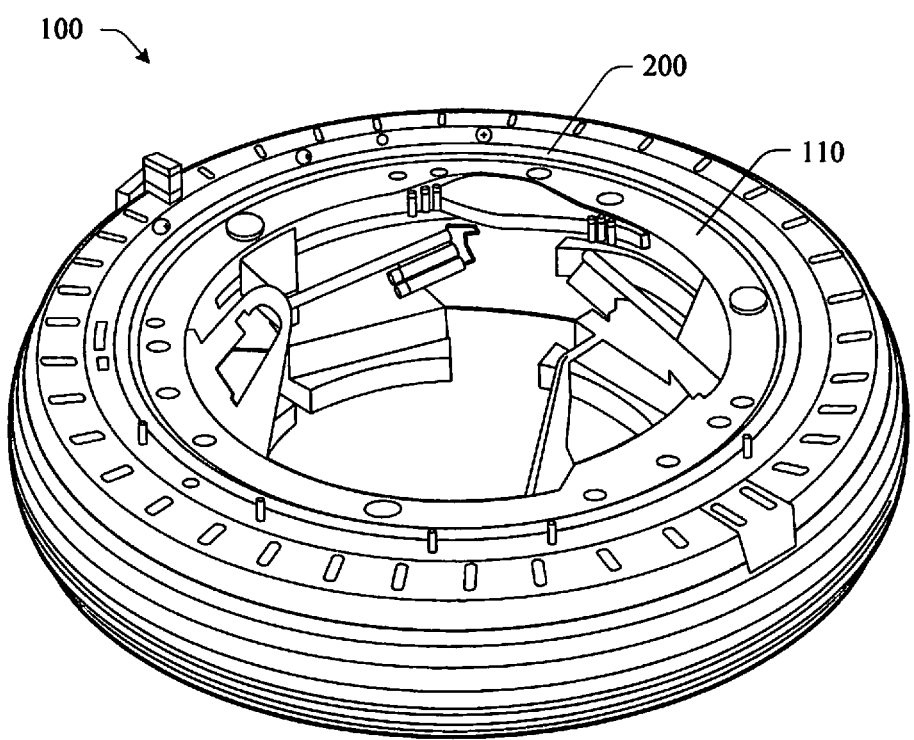
FIG. 1 is a perspective view of a space vehicle docking system utilizing an innovative docking interface seal assembly in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Disclosed herein is an innovative new seal assembly for a space vehicle docking interface that overcomes the above-mentioned disadvantages in accordance with an aspect of the innovation. The space vehicle docking interface and, hence, the seal are located on the vehicle traveling to space. Because the seal is left uncovered during travel to the destination, as mentioned above, it is exposed to the harsh space environment, which degrades the seal. The innovative seal assembly provides shrouds that cover the seal when the space vehicle and, thus the space vehicle docking interface, is not docked. The shrouds protect the seal from the damaging effects of space environments exposure. During the docking process, the shrouds retract to expose the seal so the seal can seal against the mating surface on the opposing vehicle. Because the seal will be protected while the space vehicle is not docked, the innovative seal will enable the space vehicle to remain undocked for longer periods of time while still meeting stringent leak rate requirements after docking. This will allow manned space vehicles to travel longer distances and execute different types of missions prior to docking.

Referring now to the drawings, FIG. 1 is a perspective view of a space vehicle docking system (hereinafter "docking system") 100 utilizing an innovative docking interface seal assembly (hereinafter "seal assembly") 200 in accordance with an aspect of the innovation. The docking system 100 includes a docking interface 110 that interfaces with a docking interface of the destination vehicle. The seal assembly 200 resides in a U-shaped interface sealing groove or channel defined in the docking interface 110, as shown in FIG. 2.

Figure 2A:
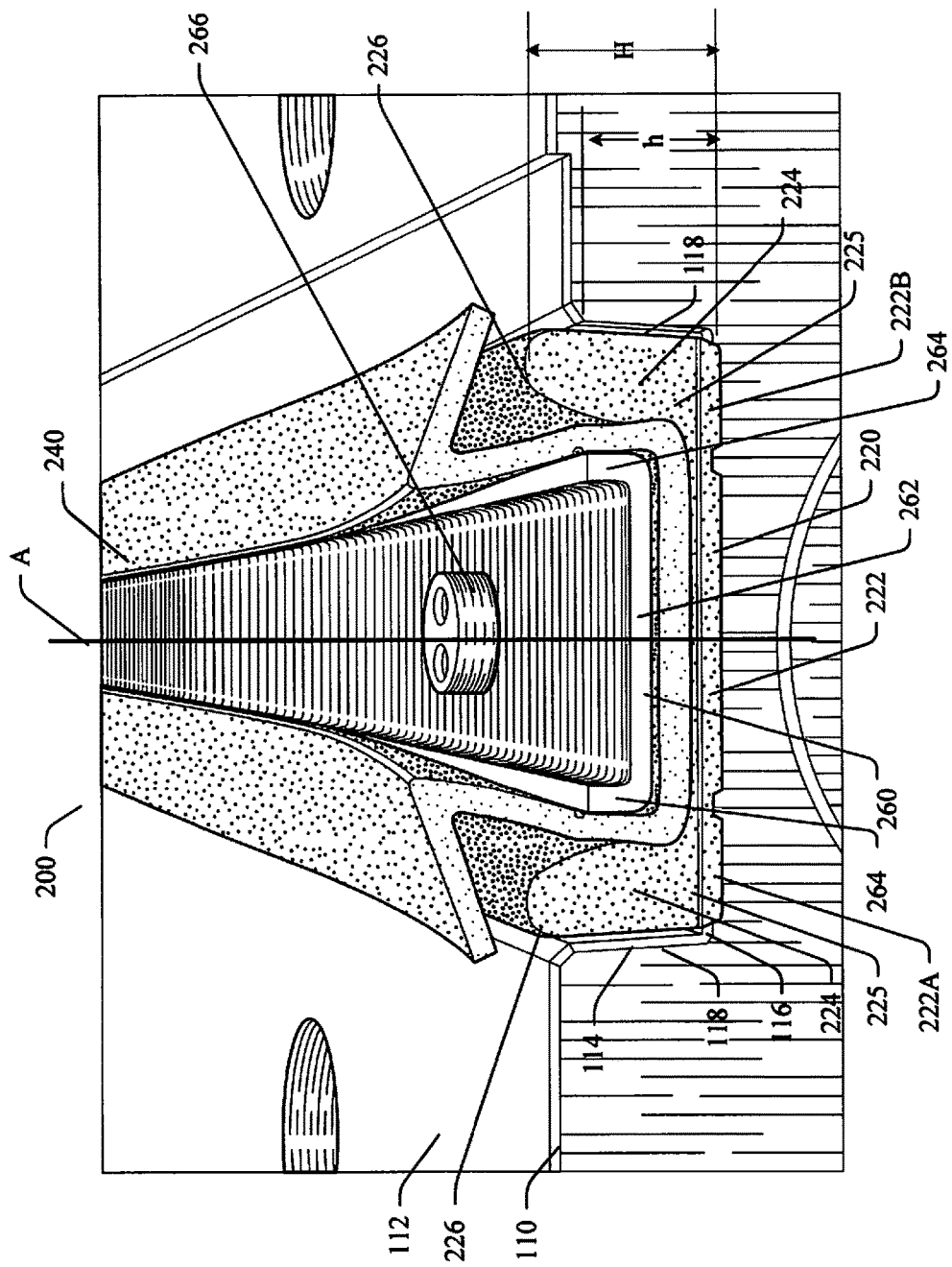
FIGS. 2A and 2B are cross-section views of the innovative seal assembly in a simulated docking interface in an undocked state in accordance with an aspect of the innovation.
Figure 2B:
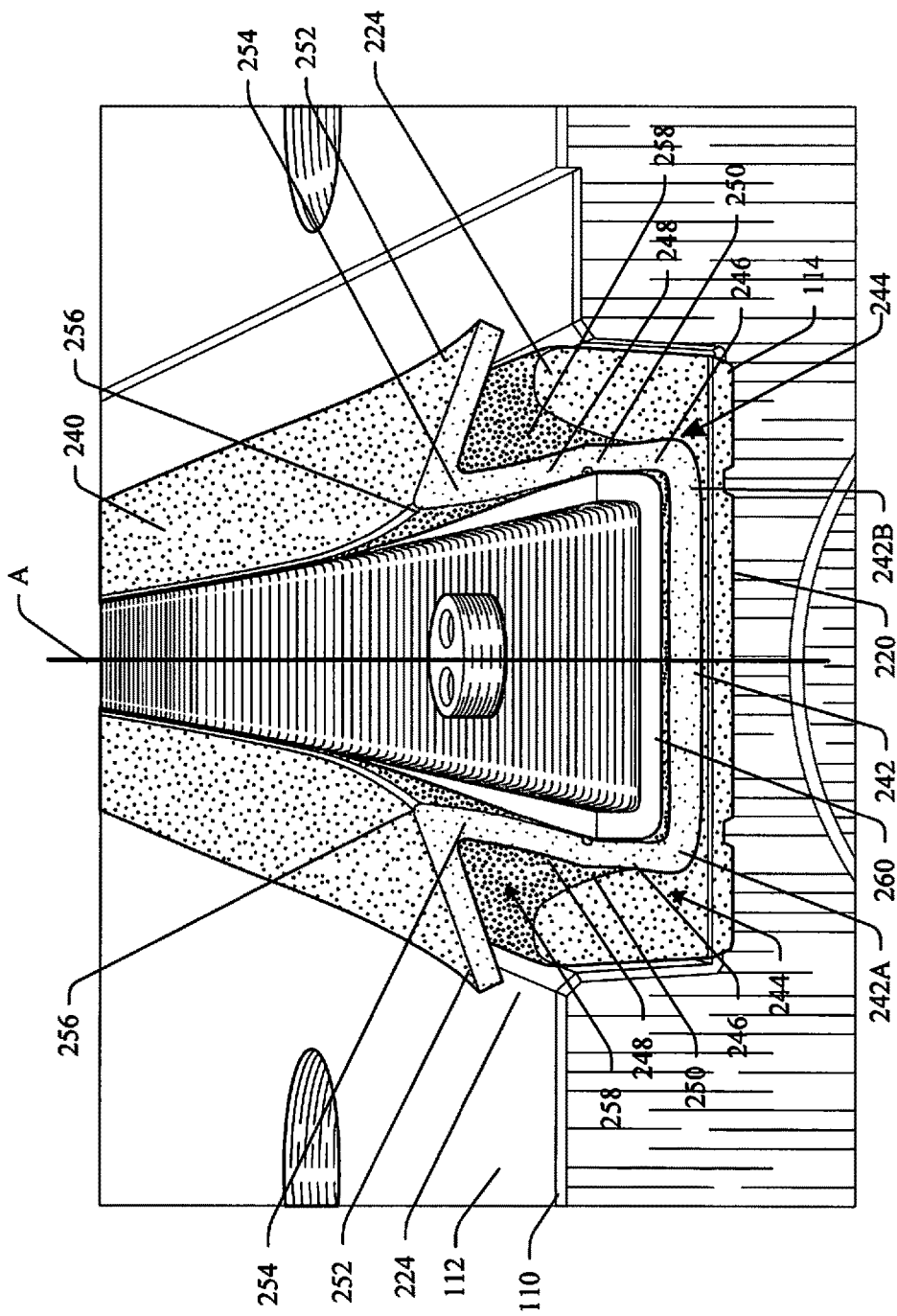

FIGS. 2A and 2B are cross-section views of the innovative seal assembly 200 in a simulated docking interface 110 in accordance with an aspect of the innovation. It is noted that FIGS. 2A and 2B are identical figures that are used for clarity to describe features of the seal assembly 200. The docking interface 100 includes a top surface 112 and an interface sealing groove or channel 114 defined therein. The sealing channel 114 includes a bottom surface or base 116 and a pair of sealing walls 118. A depth of the sealing channel in which the seal assembly 200 is installed is sized to control an amount of compression on sealing walls (described further below) and the motion of the protective shroud 240. The seal assembly 200 includes a sealing element 220, a protective shroud 240 and a seal retainer 260. For reference purposes, a center of the sealing channel 114 and the seal assembly 200 including the sealing element 220, the protective shroud 240, and the retainer 260 is represented by the longitudinal center line or axis A.

Referring to FIG. 2A, the sealing element 220 is an integrated unit, has a U-shaped cross-section and is made from an elastomer, such as but not limited to silicone. The sealing element 220 includes a sealing base 222 that resides and contacts the bottom surface 116 of the docking interface 110, and a pair of sealing walls (seal bulbs) 224 disposed on opposite ends 222A, 222B of the base 222. Two sealing walls 224 are included in the seal assembly 200 to satisfy fault tolerance and redundancy requirements for man-rated space vehicles. It is to be understood, however, that the sealing element 220 may be L-shaped and, thus have one sealing wall 224. In another embodiment, the sealing element may be T-shaped and include a center sealing wall disposed in a center of the sealing base 222. Still further, another embodiment may include a combination of the above.

The sealing walls 224 are generally parallel to each other and to the walls 118 of the sealing channel 114 and extend in a substantially perpendicular direction from the ends 222A, 222B of the base 222. The sealing walls 224 have a proximate end 225 and a distal end 226 whereby the distal end 226 extends above the top surface 112 of the docking interface 110. Thus, the sealing walls 225 have a height H that is greater than a height h of the walls 118 of the sealing channel 114. The height difference allows the sealing walls 224 to be compressed by an interface surface of an opposing vehicle during docking. In the embodiment illustrated in the figure, the distal end 226 of the sealing walls 224 is rounded. It is however, to be understood that the top can be any shape, such as but not limited to flat, angled, etc. Thus, the example embodiment illustrated in the figures is for illustrative purposes only and is not intended to limit the scope of the innovation.

Referring to FIG. 2B, the protective shroud 240 is an integrated unit, resides on top of the sealing element 220 and is configured to protect the sealing element 220 during space travel while the space vehicle is not in a docked state. The protective shroud 240 is further configured retract to a collapsed position between the sealing walls 224 during the docking process to allow the sealing element 220 to mate with the opposing interface to thereby provide a seal.

The protective shroud 240 is made from an elastomer for flexibility, such as but not limited to silicone or from metal or plastic materials to potentially reduce friction between the protective shroud 240 and an opposing sealing surface. The protective shroud 240 includes a protective base 242 that resides and contacts a top surface of the base 222 of the sealing element 220. The protective shroud 240 further includes protective shroud arms that extend beyond the height H of the sealing walls 224. The protective shroud arms are comprised of first protective extensions 244 and second protective extensions 252. The first protective extensions 244 are disposed on opposite ends 242A, 242B of the shroud base 242 adjacent to each sealing wall 224. The protective base 242 and the protective extensions 244 form a generally U-shaped configuration. The protective extensions 244 include a first portion 246 that extends from each end 242A, 242B of the protective base 242 in a substantially perpendicular direction from the protective base 242. The first portions 246 of the protective extensions 242 are generally parallel to each other and to the sealing walls 224 of the sealing element 220. Each protective extension 244 includes a second portion 248 that extends from the first portion 246 at an angle (e.g., 1-20 degrees) toward each other (toward the center A of the seal assembly 200), thus forming a first bend line (hinge) 250 between the first portion 246 and the second portion 248. During the docking process, the protective extensions 244 bend or fold toward the center A between the sealing walls 224 at or near the bend line 250 (see FIG. 3).

The second protective extensions 252 extend at an angle from a distal end 254 of the first protective extensions 244 away from the center A of the seal assembly 200 and toward the top surface 112 of the docking interface 110 (toward the distal end 226 of the sealing walls 224). Thus, the first and second extensions 244, 252 form an acute angle V-shape thereby forming a second bend line (hinge) 256 whereby the second extensions 252 provide a protective shield or cover over the sealing walls 224. In other words, the sealing walls 224 reside in the acute angled V-shape 258 between the first and second extensions 244, 252.

Referring back to FIG. 2A, the retainer 260 secures the sealing element 220 and the protective shroud 240 to the interface 110 (e.g., docking interface) and hence, to the docking tunnel 100. The retainer 260 is made from a material that withstands the space environment, such as but not limited to metal (e.g., aluminum), plastic, etc. The retainer 260 is a U-shaped device that resides on top of the protective shroud 240 and includes a base 262, a pair of walls 264, fasteners 266, and apertures that receive fasteners 266. The fasteners 266 extend through apertures in the retainer 260, the protective shroud 240, and the sealing element 220 and fasten to the base 116 of the sealing channel 114. Washers (e.g., metal washers) may be installed in the apertures below the retainer 260 to provide a load path between the retainer 260 and the bottom surface 116 of the sealing channel 114.

In alternate embodiments, additional metal washers can be installed below the heads of each fastener 266 to distribute the fastener loads and help minimize bearing stresses in the retainer 260. In another embodiment, metal washers could be integrated directly into the retainer as bosses on its lower surface. This would reduce the part count for the seal assembly.

Figure 3:
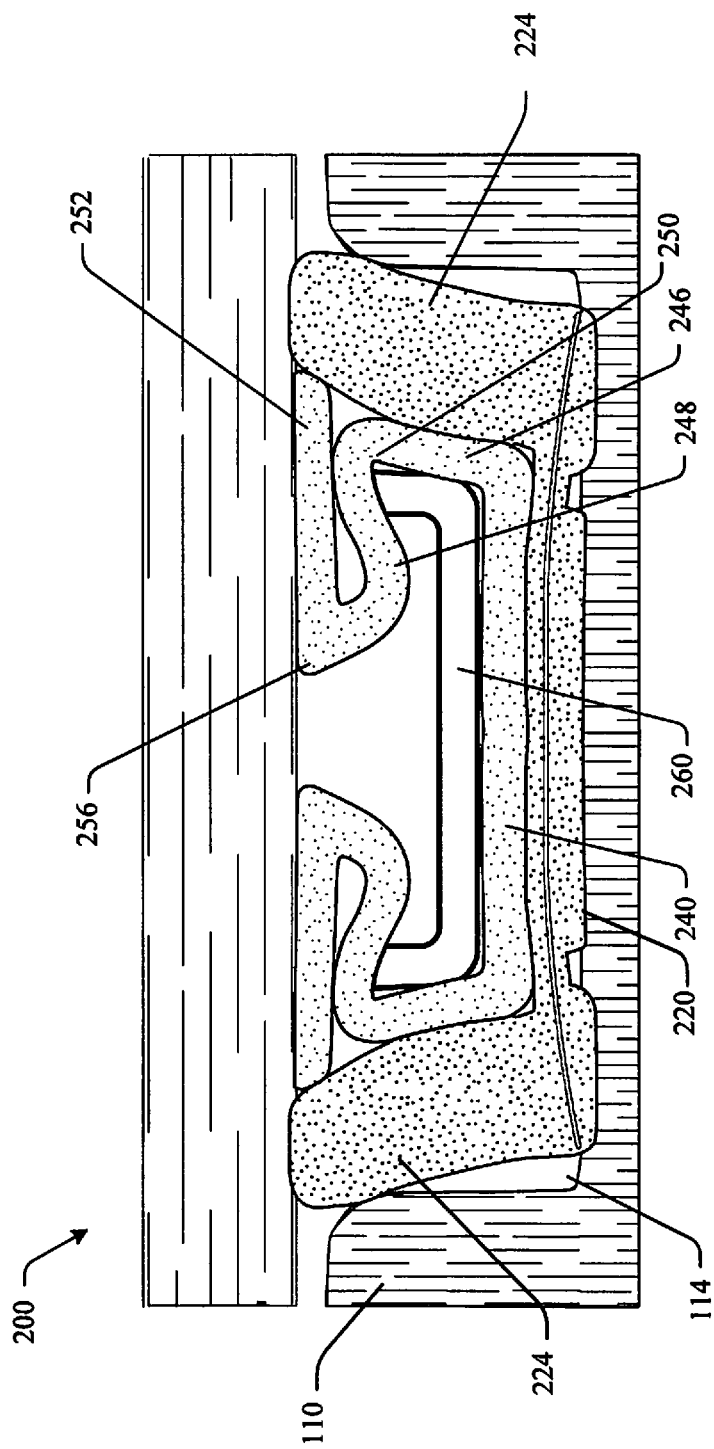
FIG. 3 is a cross-section view of the innovative seal assembly in the simulated docking interface in a docking state in accordance with an aspect of the innovation.
Figure 4:
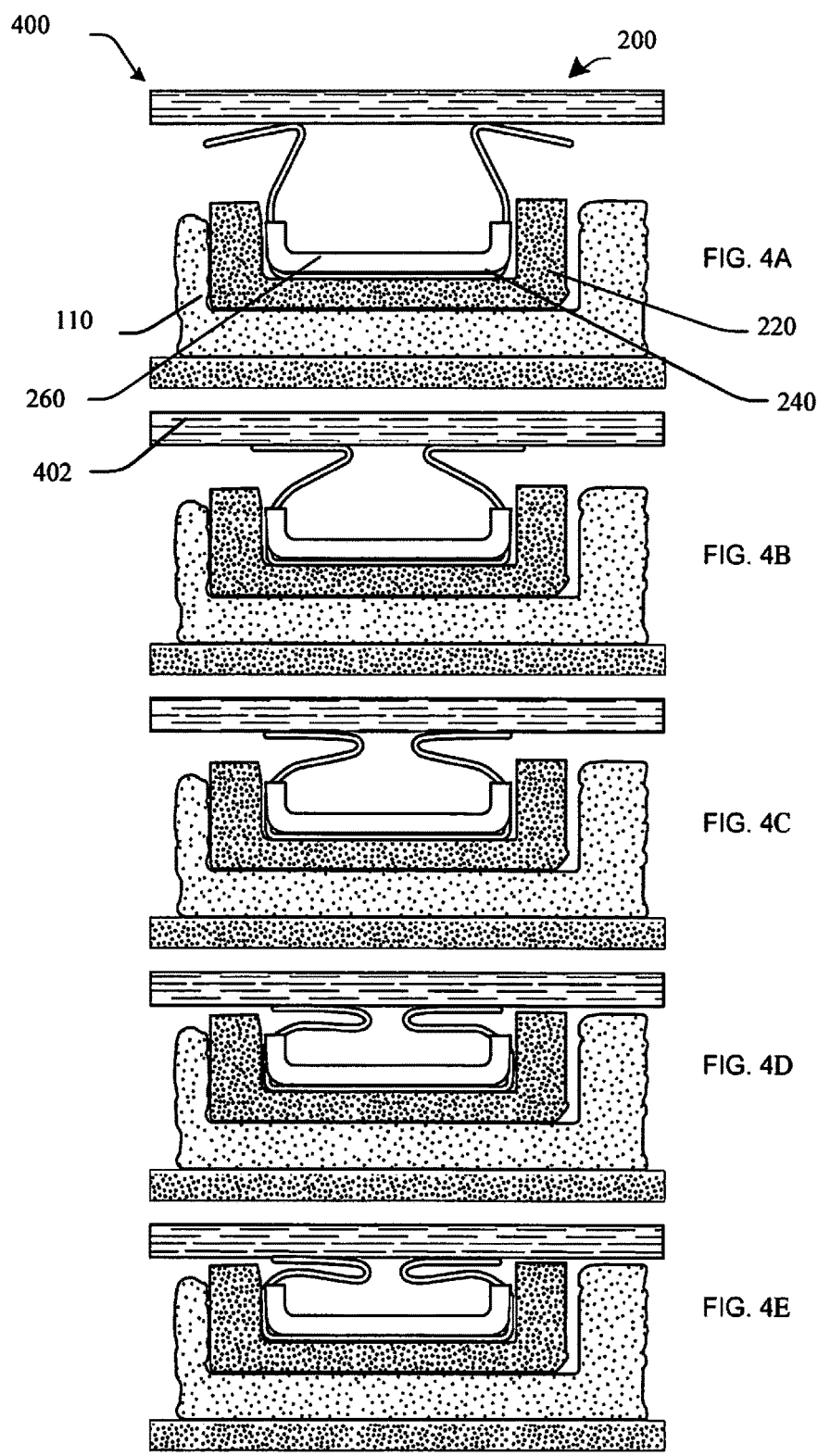
FIGS. 4A-4E illustrates a retraction sequence of a protective shroud during a docking procedure in accordance with aspects of the innovation.

As shown in FIGS. 2A and 2B, when the space vehicle is not docked with another space vehicle, the protective shroud arms 244, 252 are in an extended position to cover and protect the sealing walls 224 from exposure to space environments described herein. As shown in FIG. 3, when the space vehicle is docked, the protective shroud arms (first and second protective extensions 244, 252) retract to a space defined between the sealing walls 224 and eventually become completely uncovered and come into contact with the opposing flat metal sealing surface.

Figure 5:
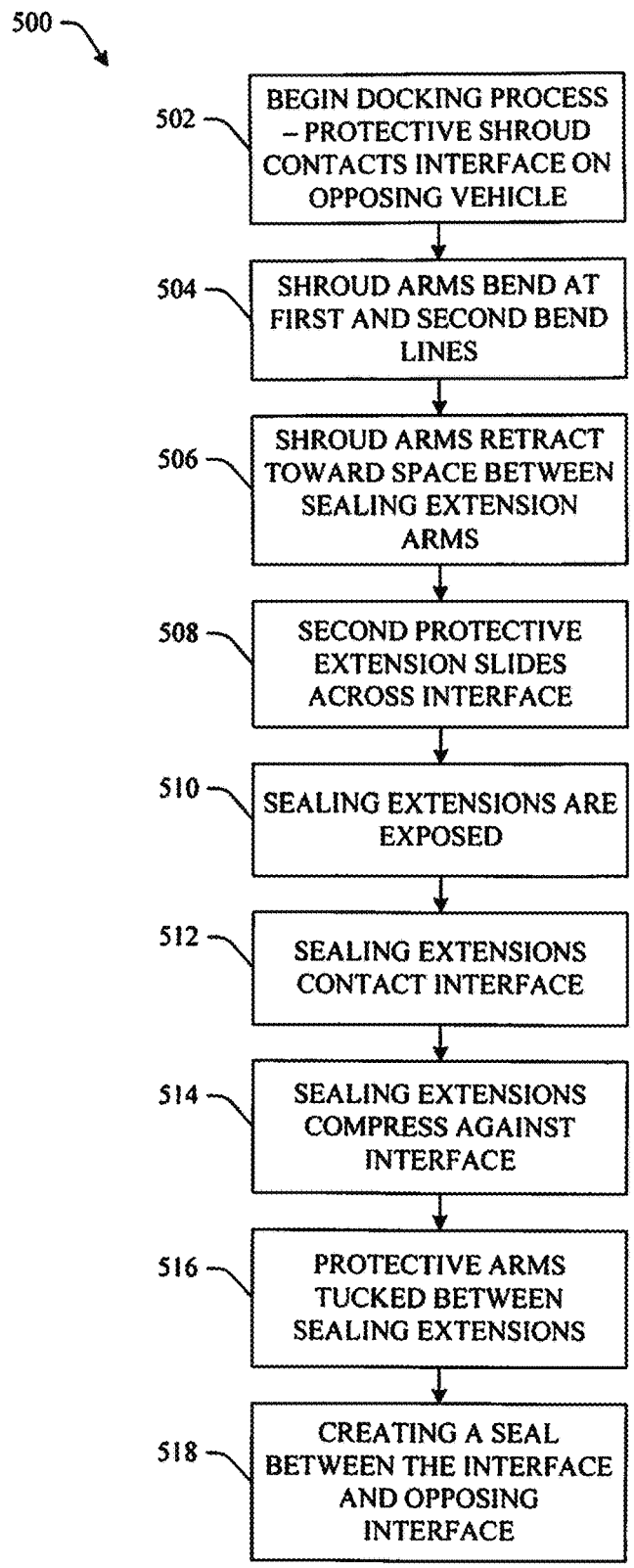
FIG. 5 is a block diagram illustration of the retraction sequence of the protective shroud during the docking process in accordance with aspects of the innovation.

With reference to FIGS. 4A-4E and to FIG. 5, a method of creating a seal with the innovative seal assembly will now be described. FIGS. 4A-4E illustrate a retraction sequence 400 of the protective shroud 240 during the docking procedure and FIG. 5 is a block diagram illustration 500 of the retraction sequence of the protective shroud during the docking process. The retraction sequence will now be described in reference to FIGS. 2A, 2B, 4A-4E, and FIG. 5. At 502, as the docking process begins, the second protective extensions 252 of each protective shroud arm comes into contact with an opposing interface 402 (e.g., a flat metal sealing surface on the opposing vehicle). At 504, as the two vehicles approach each other, the protective shroud arms begin to bend at the first and second bend lines 250,256. At 506, as the two vehicles continue to approach each other, the first and second protective extensions 244,252 are driven into the space between the two sealing walls 224 and the angle 258 between the first and second protective extensions 244,252 approaches zero. At 508, as the first and second protective extensions 244,252 are driven into the space between the two sealing walls 224, the second protective extension 252 slides across the opposing sealing surface and moves toward a centerline of the seal assembly 200. At 510, the sealing walls 224 are uncovered or exposed. At 512, the protective shroud arms (first and second protective extensions 244, 252) continue to retract, and the sealing walls 224 eventually become completely uncovered and come into contact with the opposing flat metal sealing surface, as shown in FIG. 3. At 514, as the docking process completes, the sealing walls 224 are compressed against the opposing sealing surface to seal the interface, and at 516, the protective shroud arms are tucked (disposed) into the open space between the sealing walls 224 above the retainer 260. At 518, a seal is created between the interface and the opposing interface. In addition, a seal is also created between the base 222 of the sealing element 220 and the bottom surface 116 of the channel 114. During the undocking process, the process reverses itself, and the protective shroud arms return to their extended position to cover and protect the sealing walls 224.

In alternate embodiments of the seal assembly, the protective shroud arms can be installed in other locations. For example, the protective shroud arms can be located in between each sealing channel wall and each sealing wall and extend toward the centerline of the seal assembly to cover the sealing walls. The protective shroud arms would then retract away from the center A of the seal assembly (outside the sealing walls).

In other embodiments, both protective shroud arms can be biased to the same side of each sealing wall (i.e., on the outer edges of each bulb extending inward or on the inner edges of each bulb extending outward). A single protective shroud arm could also be used to cover both sealing walls instead of two separate protective shroud arms. In such an embodiment, the arm could be located between the sealing channel wall and one of the sealing walls extending one way or the other to cover both sealing walls.

In still further alternate embodiments the protective shroud can be integrated into the sealing element and/or the retainer. For example, the retainer could be eliminated completely if the protective shroud was made of metal and also functioned as the retainer. In another embodiment, the elastomer walls and protective shroud can be overmolded onto a retainer to form a one-piece assembly. In addition, the sealing element can be configured to seal against another seal of a similar design instead of against a flat sealing surface. This would permit seal-on-seal mating between two docking systems.

Tests were performed on the innovative seal assembly to investigate the retraction of the protective shroud, optimize the protective shroud design, and predict the amount of force that would be required to fully compress the seal assembly. The effects of friction between the protective shroud and opposing sealing surface were also evaluated. For all the analyses that were performed, both the sealing element and the protective shroud were made from S0383-70 silicone. It is to be understood that the test results disclosed herein are specific only for the configuration and application of the example embodiment disclosed herein. Test results may vary based on the application, the configuration, the material, etc. of the seal assembly. Thus, the example embodiment disclosed herein is for illustrative purposes only and is not intended to limit the scope of the innovation.

Figure 6A:
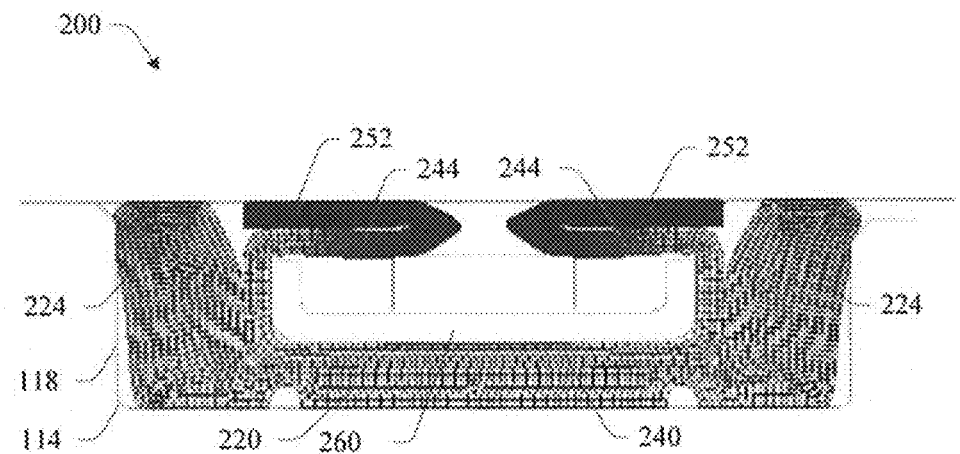
FIGS. 6A and 6B illustrate results of plane strain analyses performed on the seal assembly for friction coefficients of 0.0 and 0.5 respectively in accordance with an aspect of the innovation.
Figure 6B:
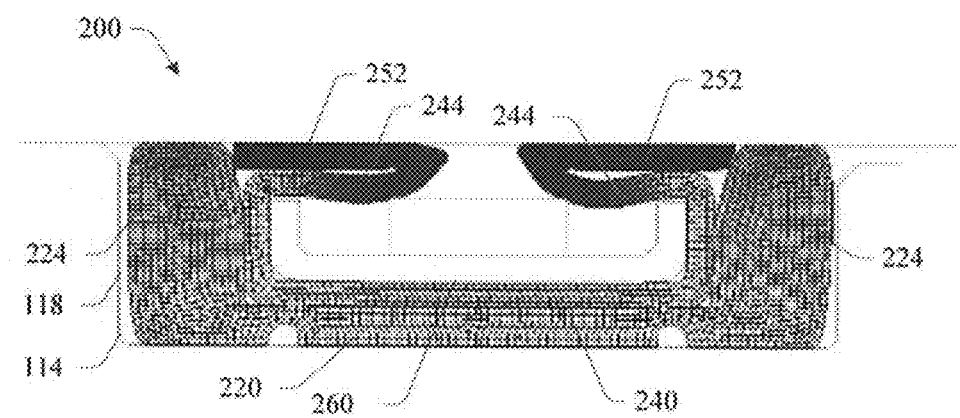

FIGS. 6A and 6B show results of plane strain analyses performed on the seal assembly for friction coefficients of 0.0 and 0.5 respectively. As illustrated in FIG. 6A where the friction coefficient was 0.0, the protective shroud arms 244, 252 fully retracted and fit into the space between the sealing walls 224. As the sealing walls 224 were compressed, they slid laterally outward and came into contact with the sealing channel walls 118 leaving a small amount of space between the top of the sealing walls 224 and a distal end of the second extensions 252 of the protective shroud arms. When the friction coefficient was increased to 0.5, illustrated in FIG. 6B, the sealing walls did not slide laterally as much due to the increased friction with the opposing surface. The protective arms of the protective shroud, however, still fully retracted into the space between the sealing walls 224 and did not interfere with the seal between the sealing walls and the interface.

Figure 7:
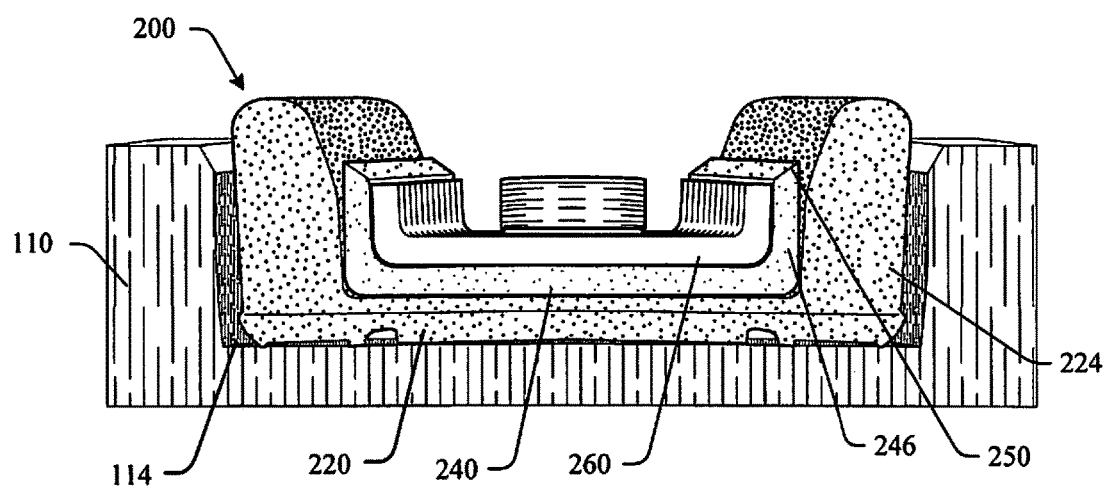
FIG. 7 is a cross-section view of a "truncated" seal assembly in the simulated docking interface for test purposes in accordance with an aspect of the innovation.

Table 1 below illustrates an amount of force predicted to fully compress the seal assembly from various types of analyses. The results include predictions from both axisymmetric and plane strain models for friction coefficients of 0.0 and 0.5. In addition to projected loads for the full seal assembly, the table also shows the results for analyses performed with a "truncated protective shroud arm" (see FIG. 7), where the protective shroud arm is removed at the first bend line 250 so the loads required to compress only the sealing walls 224 could be assessed.

As was to be expected based on the results shown in FIGS. 6A and 6B, the projected seal compression loads were higher for the cases where the friction coefficient was 0.5 than they were for the frictionless cases. For the frictionless cases, the sealing walls slid laterally when they were compressed resulting in a deflected shape and slightly lower loads. For the cases where the friction coefficient was 0.5, however, the seals remained more vertical resulting in more material in the load path and higher loads.

The plane strain cases had slightly lower projected compression loads for the full seal assembly than the axisymmetric cases did. This is likely due to the additional constraint provided by the hoop-shaped seal in the axisymmetric cases which resulted in higher projected loads. Projected compression loads were also lower for the cases with the truncated shroud than for the full seal assembly. For example, the projected load to compress the full seal assembly with a friction coefficient of 0.5 was 17.4 lbf/in., whereas the load to compress just the seal element under the same conditions was 15.9 lbf/in. Based on the results of these analyses, the majority of the load required to compress the seal assembly was used to compress the sealing walls with only about 10% being used to compress the protective shroud. Regardless of the type of analysis and friction coefficient, projected seal loads were well below the load threshold of approximately 70 lbf per inch of sealing wall.

TABLE 1

| Shrouded seal configuration | Analysis type | Friction coefficient | Projected load per inch of seal bulb (lbf/in.) |
|---|---|---|---|
| Full assembly | Axisymmetric | 0.0 | 17.4 |
| Full assembly | Axisymmetric | 0.5 | 18.5 |
| Full assembly | Plane strain | 0.0 | 16.6 |
| Full assembly | Plane strain | 0.5 | 17.4 |
| Truncated shroud (seal element only) | Plane strain | 0.0 | 15.4 |
| Truncated shroud (seal element only) | Plane strain | 0.5 | 15.9 |

Compression tests were performed on the seal assembly at approximately 68°. As with the analyses described above, tests were performed on both the full seal assembly and the seal assembly with the truncated protective shroud. The truncated assembly was subjected to 11 load cycles. For the first and last cycles, the test article was compressed at a rate of 0.008 in./sec and unloaded at a rate of 0.010 in./sec. For the second through the tenth cycles, the test article was compressed at a rate of 0.004 in./sec and unloaded at 0.010 in./sec. The full assembly was compressed once at a rate of 0.008 in./sec and unloaded at a rate of 0.010 in./sec. Seal loads were measured during each load cycle with the peak compression load occurring approximately when metal-to-metal contact of the test platens occurred.

The force required to compress only the seal element was measured as 516±34 lbf during the first load cycle and 400±34 lbf for the eleventh cycle. This corresponded to loads of 25.8 and 20.0 lbf per inch of sealing wall for the first and last cycles on the 10 in. seal, respectively. These loads were well below the load threshold of approximately 70 lbf per inch of sealing wall.

Table 2 compares the projected loads required to compress only the sealing walls with the loads measured during the compression test. The material properties used for the analyses corresponded to those measured for the S0383-70 silicone material after a break-in period of many loading cycles. Therefore, the load measured for cycle 11 of the compression test is most appropriate to compare to the analytical results. Comparing the load measured for cycle 11 to the projected load for the analysis performed with a friction coefficient of 0.5, the analysis under predicted the actual load required to compress the seal by about 25% (20.0 vs. 15.9 lbf/in.).

TABLE 2

| Source | Friction coefficient | Load per inch of seal bulb (lbf/in.) |
|---|---|---|
| Plane strain analysis | 0.0 | 15.4 |
| Plane strain analysis | 0.5 | 15.9 |
| Compression test, load cycle 1 | TBD | 25.8 |
| Compression test, load cycle 11 | TBD | 20.0 |

Figure 8:
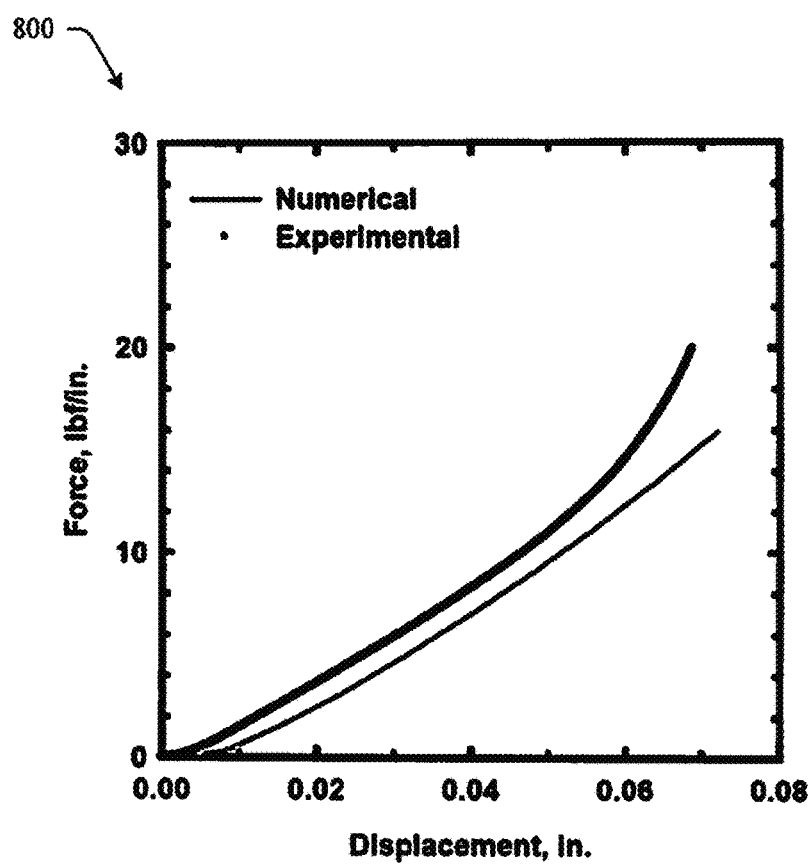
FIG. 8 is a graph that compares loads measured for a cycle of a compression test to those predicted for a plane strain analysis of the "truncated" seal assembly with a friction coefficient of 05 in accordance with an aspect of the innovation.

FIG. 8 is a graph 800 that compares the loads measured for cycle 11 of the compression test to those predicted for the plane strain analysis of the seal with a truncated shroud and a friction coefficient of 0.5. The load curves were fairly linear for both cases and ran parallel to each other for most of the compression period. Toward the end of the compression test, the experimental load curve began to diverge and increase at a greater rate than what was predicted by the analysis. This contributed to the difference between the analysis and test results.

During the design and test process on the innovative seal assembly, the following findings were observed:
1) The protective shroud arms fully retracted during plane strain analyses for friction coefficients of 0.0 and 0.5 between the seal components and opposing sealing surface.
2) Analyses performed on the new seal design predicted that the amount of force required to fully compress the seals was higher for:
   a. Cases where the friction coefficient was higher,
   b. An axisymmetric model than for a plane strain model, and
   c. The full shrouded seal assembly than for cases where the shroud was truncated and removed at the hinge point directly above the retainer.
3) Projected loads to fully compress the seal assembly were well below the load threshold of approximately 70 lbf per inch of sealing wall for all cases evaluated.
4) Testing revealed that the force required to compress only the sealing element was 25.8 and 20.0 lbf per inch of sealing wall for the first and eleventh load cycles on the 10 in. seal, respectively.

5) During compression testing of the full shrouded seal assembly, the shroud fully retracted between the sealing walls without landing on the top of the sealing walls.

6) Plane strain analyses of the seal assembly with a truncated shroud under predicted the actual load required to compress the seal by about 25% (20.0 vs. 15.9 lbf/in.).

The innovative seal assembly can be used on future missions with longer periods of unmated operation and increased levels of space environments exposure prior to docking. It satisfies all of the key design guidelines given that it fits into the existing sealing groove, has two sealing walls for fault tolerance, seals against a flat metal sealing surface, can be uninstalled and reinstalled or interchanged with a replacement seal if needed, meets the load per inch criteria, and was designed to accommodate multiple docking and undocking cycles. Tests and analyses performed to date have shown that the shroud retracts between the sealing walls as it is compressed, and projected and measured loads required to compress the seal have been below the load threshold of approximately 70 lbf per inch of sealing wall.

It is to be understood that the innovative seal assembly can be used in other applications, such as but not limited to seals for dusty or debris-containing environments, seals for petroleum industry applications, seals for chemical industry applications, etc. Thus, the example embodiment described and illustrated herein is for illustrative purposes only and is not intended to limit the scope of the innovation.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A seal assembly comprising:
   a sealing element having a base and a first sealing wall extending generally perpendicular from the base, wherein the first sealing wall includes a proximal end extending from a surface of the base and a distal end;
   a protective shroud that retracts to expose the distal end of the first sealing wall when in contact with an opposing surface, wherein the protective shroud includes a protective base and a first shroud arm that extends from the protective base, wherein the first shroud arm includes a portion that is more distant from the base than the distal end, wherein the portion overlaps with the distal end in a direction substantially perpendicular to the surface of the base when not in contact with the opposing surface; and
   a retainer that secures the sealing element and the protective shroud to an interface.

2. The seal assembly of claim 1, wherein the sealing element includes a second sealing wall, wherein the first and second sealing walls each extend from a different end of the base, and wherein the protective shroud includes a second shroud arm, wherein the first and second shroud arms each extend from a different end of the protective base, wherein the first shroud arm extends adjacent to the first sealing wall, wherein the second shroud arm extends adjacent to the second sealing wall, wherein the second shroud arm includes a portion that overlaps with a distal end of the second sealing wall in the direction when not in contact with the opposing surface.

3. The seal assembly of claim 2, wherein the first and second shroud arms include first extensions and second extensions, wherein the protective base and the first extensions form a generally U-shape configuration, wherein the second extensions of the first and second shroud arms correspond to the portions that overlap the distal ends of the first and second sealing walls.

4. The seal assembly of claim 3, wherein the first extensions include a first portion, a second portion, and a first bend line, wherein the first portion attaches to each end of the protective base and extends in a substantially perpendicular direction from the protective base adjacent to the sealing wall, and wherein the second portion attaches to the first portion and extends at an angle toward a center of the protective shroud, and wherein the first bend line is formed between the first portion and the second portion.

5. The seal assembly of claim 4, wherein the second extensions extend from a distal end of the first extensions at an angle away from the center of the protective shroud and toward the distal ends of the first and second sealing walls.

6. The seal assembly of claim 5, wherein, in both the first and second shroud arms, a second bend line is formed between the second portion of the first extension and the second extension of that shroud arm.

7. The seal assembly of claim 6, wherein when the protective shroud comes in contact with the opposing surface, the first and second shroud arms each bend at both their respective first bend line and second bend line thereby retracting toward the center of the protective shroud into a space defined between the first and second sealing walls.

8. A sealing system comprising:
   an interface having a U-shaped channel defined therein;
   a U-shaped sealing element disposed in the U-shaped channel having a pair of sealing walls extending from a base, wherein each one of the pair of sealing walls includes a distal end;
   a protective shroud disposed over the U-shaped sealing element, wherein the protective shroud includes portions that are more distant from the base than the distal ends, wherein the portions overlap with the distal ends in a direction substantially perpendicular to the base when the protective shroud is not in contact with an opposing interface, wherein, when the protective shroud is in contact with the opposing interface, the portions retract between the pair of sealing walls such that the portions do not overlap with the distal ends in the direction; and
   a retainer that secures the sealing element and the protective shroud to the U-shaped channel.

9. The sealing system of claim 8, wherein the U-shaped channel of the interface includes a base and walls, and wherein a height of the sealing walls is greater than a height of the walls of the U-shaped channel.

10. The sealing system of claim 8, wherein the protective shroud includes a pair of shroud arms, one each extending adjacent to the sealing walls, and wherein the pair of shroud arms extend above a height of the sealing walls.

11. The seal assembly of claim 10, wherein the pair of shroud arms include first extensions and second extensions, wherein the protective base and the first extensions form a generally U-shape configuration, wherein portions of the protective base that overlap with the distal ends in the direction correspond to the second extensions.

12. The seal assembly of claim 11, wherein the first extensions include a first portion, a second portion, and a first bend line formed between the first portion and the second portion, and wherein the second portion extend at an angle toward a center of the protective shroud.

13. The seal assembly of claim 12, wherein the second extensions extend from a distal end of the first extensions at an angle away from the center of the protective shroud and toward a distal end of the sealing walls.

14. The seal assembly of claim 13, wherein a second bend line is formed between the second portion of the first extensions and the second extensions.

15. The seal assembly of claim 14, wherein when the protective shroud comes in contact with the opposing interface, the protective arms bend at both the first bend line and the second bend line thereby retracting toward the center of the protective shroud into a space defined between the pair of sealing walls.

16. A method of creating a seal comprising:
providing an interface having a seal assembly disposed therein, wherein the seal assembly comprises:
a sealing element having a base with a first end and a second end;
a first sealing wall extending from the first end; and
a second sealing wall extending from the second end, wherein the first and second sealing walls both include a distal end, wherein the seal assembly includes a protective shroud that includes portions that are more distant from the base than the distal ends, wherein the portions overlap with the distal ends in a direction substantially perpendicular to the base;
contacting the portions of the protective shroud of the seal assembly with an opposing interface;
retracting the portions of the protective shroud toward a center of the protective shroud;
contacting the first and second sealing walls with the opposing interface;
compressing the first and second sealing walls against the opposing interface; and
creating a seal between the interface and the opposing interface.

17. The method of claim 16, further comprising, prior to retracting the portions of the protective shroud toward the center of the protective shroud, bending the portions at a first bend line and at a second bend line.

18. The method of claim 16, further comprising, prior to contacting the first and second sealing walls of the sealing element with the opposing interface, exposing the distal ends of the first and second sealing walls.

19. The method of claim 16, further comprising, prior to compressing the sealing walls against the opposing interface, disposing the protective arms in a space defined between the first and second sealing walls.

* * * * *